United States Patent [19]

Lowiciki et al.

[11] 4,376,108

[45] Mar. 8, 1983

[54] PROCESS AND APPARATUS FOR RECLAIMING SULFUR-CONTAINING WASTE MATERIALS

[75] Inventors: Norbert Lowiciki; Joachim Wolf; Wolfgang Schwarz, all of Duisburg, Fed. Rep. of Germany

[73] Assignee: Grillo-Werke AG, Duisburg-Hamborn, Fed. Rep. of Germany

[21] Appl. No.: 208,536

[22] Filed: Nov. 20, 1980

[30] Foreign Application Priority Data

Nov. 24, 1979 [DE] Fed. Rep. of Germany ....... 2947497

[51] Int. Cl.³ .................. C01B 17/50; C01G 17/00
[52] U.S. Cl. .................. 423/540; 423/525; 423/531; 208/13
[58] Field of Search .............. 423/210 C, 245, 525, 423/526, 527, 528, 531, 540; 208/13

[56] References Cited

U.S. PATENT DOCUMENTS

| | | | |
|---|---|---|---|
| 2,019,893 | 11/1935 | Clark | 423/533 |
| 2,049,243 | 7/1936 | Bartholomew | 423/533 |
| 2,091,943 | 8/1937 | Gilchrist et al. | 423/540 |
| 2,263,766 | 11/1941 | Fentress et al. | 423/540 |
| 2,812,291 | 11/1957 | Hughes | 208/13 |
| 3,873,671 | 3/1975 | Reed et al. | 423/245 R |
| 4,125,593 | 11/1978 | Scheifley et al. | 423/240 |
| 4,198,384 | 4/1980 | Robinson | 423/240 |

FOREIGN PATENT DOCUMENTS 623355 7/1961 Canada .................. 208/13

Primary Examiner—Gary P. Straub
Attorney, Agent, or Firm—Merriam, Marshall & Bicknell

[57] ABSTRACT

Disclosed are a process and apparatus useful for reclaiming sulfur-containing waste materials such as waste or spent sulfuric acid and acid tars.

The sulfur-containing waste material is burned in a multi-stage combustion furnace having, in sequence, a rotary furnace containing heated coke, an intermediate combustion chamber and a secondary combustion chamber. The temperatures, gas flow rates and amount of added air are carefully controlled.

A separation gas is produced having a high sulfur dioxide content which can be used in the sulfuric acid contact process. The separation gas is free of nitrous oxides, hydrocarbons and sulfur trioxide.

12 Claims, 1 Drawing Figure

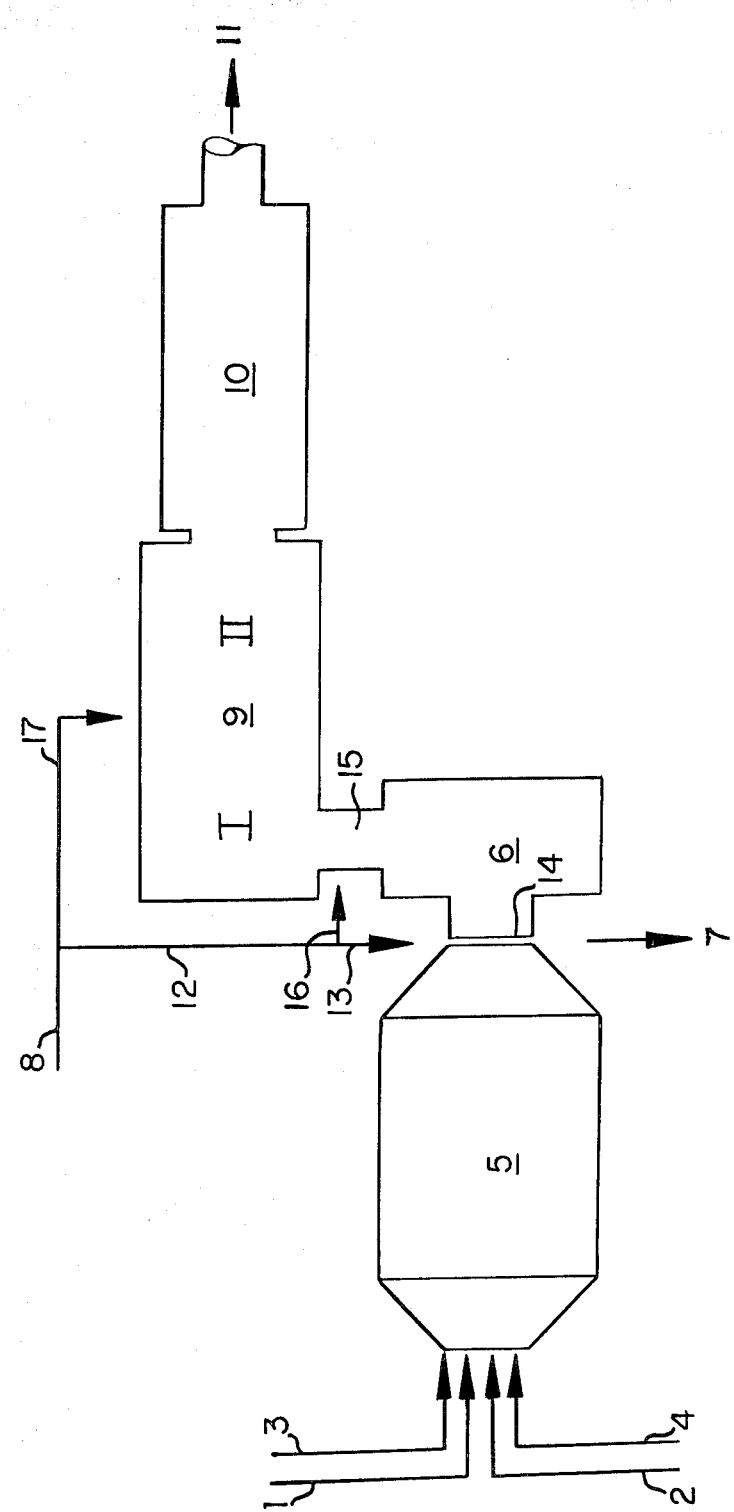

PROCESS AND APPARATUS FOR RECLAIMING SULFUR-CONTAINING WASTE MATERIALS

This invention relates to production of a sulfur dioxide-containing gas which can be used in sulfuric acid production. More particularly, this invention is concerned with apparatus and processes of producing a sulfur dioxide-containing gas, useful in sulfuric acid production, from sulfur-containing waste and spent materials of widely different chemical and physical composition.

BACKGROUND OF THE INVENTION

Waste sulfuric acids and acid tars or acid sludges, are obtained from many processes used in the organic chemical industry, particularly the petrochemical industry in which the processing of oils and other materials leads to the formation of such wastes. Furthermore, during the processing of solid coal tar, as well as in the manufacture of intermediate chemical products in the synthetic chemical and dyestuff industries, sulfur-containing organic compounds are obtained as by-products or waste products. Those by-products and waste products include higher alkyl mercaptans and/or aryl mercaptans and thioether mercaptans.

Great difficulties are involved in processing, or destroying, sulfur-containing waste products in a way which is not detrimental to the environment but which permits recovery of the sulfur and utilization of the thermal energy potential in such products. Many of the difficulties are caused by the greatly varying physical and chemical characteristics of the products as, for example, their consistency, viscosity, heat of combustion and heat of decomposition or separation.

In the past, sulfur-containing by-products and waste products, usually after neutralization, have been disposed off in sewage or sanitary lines, or by discharge into rivers and coastal waters. Because of the increasing amounts of such wastes and their harmful effect on the environment, such disposal is no longer permitted in most parts of the world. However, disposal of sulfur-containing wastes by the described method continued for a long time, and not until recently has that method of disposal been stopped, even though processes of treating the waste products were known.

One method of processing sulfur-containing wastes is disclosed in German Pat. No. 626,481. That patent discloses mixing waste sulfuric acids with solid particles, such as sand, spent Fullers earth and/or granulated coke, heated to 300° to 350° C. in special furnaces to decompose the waste acids. Use of the solid particles, which must be recirculated in the process, is detrimental since they cannot be completely removed from the product reclaimed from the waste acids.

Another method, disclosed in German Pat. No. 960,184, sprays waste sulfuric acids alone, or mixed with acid tars, into a vertical or horizontal cylinder to decompose them. Gaseous or liquid fuels, and possibly also sulfur, are used to maintain a suitable heat balance. A disadvantage of this method is that only relatively low viscosity waste acids of uniform composition can be used. Highly viscous acid tars must first be mixed with concentrated sulfuric acid and the mixture then fed into the furnace. However, it is first necessary to separately prepare the highly concentrated sulfuric acid by evaporation of dilute waste acid.

Another previously known method is to decompose the waste acid by contacting it with a gas, which can be up to 75% water vapor, heated to about 430° to 480° C., and then cooling the reaction gas mixture to 15° C. In this way, water as well as the non-decomposed hydrocarbon vapors were to be condensed out, leaving a gas which was to be 95% sulfur dioxide. A disadvantage of this method is that hydrocarbon dissolve in sulfur dioxide so that separation of these two components is about impossible. Further processing of the gas into 100% pure sulfur dioxide, or into sulfuric acid, encountered insurmountable difficulties.

Another process which failed involved processing acid sludge and waste sulfuric acids to obtain sulfur dioxide with a high percentage purity, or sulfuric acid. In this process, waste acids were continuously mixed with 15 to 30 times as much ground coke previously heated to 230° to 300° C. The coke was first heated, directly and separate from the waste acids, and transported hot by means of worm conveyors and lifting conveyors. Another disadvantage of the process was the extreme wear which occurred on the conveyors due to the strong corrosiveness of the coke.

None of the described processes was successful even though repeated substantial efforts were made in industrial process engineering to control the waste acid heating and reclaiming process and to free it of problems.

One must not overlook the fact, in developing a reclaiming process, that the carbon content of waste sulfuric acids and acid tars varies. The amount of additional heat needed for their decomposition will be higher or lower, depending on the carbon content in the waste product. However, excess heat can be produced during decomposition of the waste product and this, above all, is true when acid sludge and acid tars are decomposed.

Even when combustible materials, such as heating oil, gas or elemental sulfur, are used in the decomposition process often, due to too little heat, incomplete decomposition results and the sulfuric acid or $SO_3$ which form first are not further decomposed. However, a surplus of carbon causes the formation of coke in the waste acids and that coke prevents complete combustion of the hydrocarbons in the separation gas. This coke only burns reluctantly and does not supply the heat required for the separation process.

Efforts have been made, as see German Pat. No. 627,327, to use two rotary furnaces in series and to effect the separation, as well as combustion of surplus coke, in separate chambers and to effect heat transfer by radiation. This method of operation was unsuccessful.

A further problem involved in reclaiming waste acids and acid tars is due to the extremely variable consistencies and viscosities of these products. It is almost impossible to spray all of them into a combustion chamber with a sufficiently fine distribution so that the fine droplets completely react in suspension or completely decompose themselves. Also, preheating of acid tars and acid sludge, and the use of high spraying pressures, does not result in a sufficiently fine distribution necessary for decomposition in suspension, even though spraying is presently an indispensible prerequisite in all common waste acid treatment processes. Consequently, the qualitative scope of the waste sulfuric acid reclaiming methods is limited to those acids which have a uniform viscosity and a uniformly high carbon content.

Another problem common to all previously known acid separating processes which use added oil or gas and operate in the range of 1000° C. to 1200° C., is the formation of nitrous oxides. The nitrous oxides contaminate fresh sulfuric acid formed from the released separation gases. Moreover, when sulfur dioxide reacts with nitrous oxides in a "lead chamber reaction," the formation of sulfuric acid vapors is favored. These vapors, which are hard to absorb or cannot be condensed, cause an increase in damaging emissions from sulfuric acid factories.

From the above it is believed clear that there is a need for a new or improved method, and apparatus, for reclaiming sulfuric acids, acid tars and similar waste products, containing sulfur and carbon, of varying composition, consistency and viscosity, and with varying content of carbon, sulfuric acid, and sulfur in other combined forms, together or in quick succession, in one single process which can be carried out continuously and is easily controllable. In addition, it would be highly desirable to be able to employ a multi-stage combustion furnace for the waste acid recovery and to effect therein complete decomposition of all of the sulfur trioxide which is formed early in the acid separation, complete combustion of all hydrocarbons which are converted to gases, as well as a minimum formation of nitrous oxides.

SUMMARY OF THE INVENTION

According to one aspect of the invention, there is provided a process of producing a sulfur dioxide-containing gas from a sulfur-containing waste or spent material comprising:

feeding the sulfur-containing material, in a first stage, into a rotary furnace containing a coke bed at a temperature of at least 400° C. together with about 25 to 55% of the total amount of air needed in the whole or overall process so that the resulting reducing separation gas mixture formed in the furnace is heated to a temperature in the range of about 800° C. to 1100° C.;

feeding the reducing separation gas mixture, in a second stage, from the rotary furnace to an intermediate chamber and adding to the reducing gas about 10 to 15% of the total amount of air required in the whole process, and maintaining a volume velocity of about 200 to 400 $Nm^3$ gas/$m^3$ of combustion space as the temperature of the gas mixture increases to be in the range of about 1150° C. to 1350° C.;

feeding the gas from the intermediate combustion chamber, in a third stage, to the forward combustion space of a secondary combustion chamber and adding to the gas about 20 to 45% of the total amount of air required in the whole process thereby forming a volume velocity of 50 to 180 $Nm^3$ gas/$m^3$ of combustion space in the forward combustion space of said secondary combustion chamber as the separation gas cools to a temperature in the range of about 1000° C. to 1200° C.;

in a fourth stage, feeding the remaining portion of the total air required in the whole process into the center portion of the secondary combustion chamber into admixture with the separation gas therein so that the gas admixture is at a temperature in the range of 1000° C. to 1200° C. and a volume velocity of 150 to 400 $Nm^3$ gas/$m^3$ of combustion space is thereby obtained; and removing the resulting sulfur dioxide-containing separation gas from the secondary combustion chamber.

As used herein "volume velocity" means the same as "space velocity." Furthermore, the volume velocity rates are given on a per hour basis, even if not specifically so stated.

According to a second aspect of the invention, there is provided a multi-stage combustion furnace for reclaiming sulfur-containing waste materials which comprises a rotary furnace containing a coke bed, an intermediate combustion chamber in gas flow communication with the rotary furnace, a secondary combustion chamber in gas flow communication with the intermediate combustion chamber, means for removing sulfur dioxide containing gas from the secondary combustion chamber, and means to feed air to the rotary furnace, the intermediate combustion chamber, and the secondary combustion chamber.

BRIEF DESCRIPTION OF THE DRAWING

The drawing illustrates diagrammatically one embodiment of a multi-stage combustion furnace provided by the invention.

DETAILED DESCRIPTION OF THE DRAWING

A rotary furnace 5 contains a coke bed which is preheated to at least 400° C. A series of conduits is provided to feed various materials to rotary furnace 5. Thus, conduit 1 can be used to feed waste acids, while conduit 2 can be used to feed acid tar and waste products containing sulfur and carbon, to furnace 5. Conduits 1 and 2 can be used singly or simultaneously. Conduit 3 can be used to feed elemental sulfur, which is sometimes desirable, to furnace 5. In addition, conduit 4 is used to feed air into rotary furnace 5.

The waste acids and/or acid tar and waste products containing sulfur and carbon, are fed directly into the front part of rotary furnace 5 onto the top of the heated coke bed. Depending on the waste material fed to the furnace, about 25 to 55% of the total amount of air needed in the overall process is simultaneously fed by primary air supply conduit 4 into rotary furnace 5. In general, it suffices to blow in about 35 to 45%, and preferably 40%, of the total amount of air needed in the process, as primary air.

As a result of the combustion which takes place in rotary furnace 5, the coke and the resulting gas mixture are heated to a temperature in the range of about 800° to 1100° C. when leaving the furnace. It is desirable to operate so that at the front of the furnace the coke bed is at a temperature of about 500° C. and at the exit end the coke temperature is about 1000° C.

Depending on the composition of the initial waste material, surplus coke can be formed which is discharged at the exit of the furnace 5. Particularly useful for the discharge of surplus coke is an annular slot 7 between the exit end of furnace 5 and intermediate combustion chamber 6. The coke discharged from rotary furnace 5 through slot 7 can be collected and, if desired, it can be returned to the front portion of the furnace and used as make-up coke during the process.

The coke in rotary furnace 5 is a movable bed so that the waste acids, acid tars, acid sludge and so forth fed to the furnace distribute evenly onto and into the coke without extraneous mixing or dispersion action.

Air supply to, and the temperature in, rotary furnace 5 are adjusted so that only a partial combustion of the carbon in the waste materials takes place. This is also true for any elemental sulfur which is added, whether in liquid or solid form. Elemental sulfur, however, is only added when the heat requirement of the total process makes this necessary and/or when the resulting sulfur dioxide concentration in the separation gas produced in the process is too low. However, it is desirable at all times to only produce an amount of coke by partial combustion of the hydrocarbons in the waste material which is necessary to maintain a level coke bed in rotary furnace 5.

Since the waste acids, acid tars and so forth fed or pumped to the coke bed are quickly distributed through the moving bed, combustion or decomposition of the waste materials directly on the refractory lining of the furnace 5 is avoided. Damage to the refractory lining of the furnace by means of acid action is thus avoided. To the extent a coke surplus is formed, it is discharged, desirably continuously, from the furnace exit by means of an overflow weir and annular slot 7.

The coke bed serves to promote the combustive reaction while also functioning to equalize the reaction and thus control it. In addition, the coke bed constitutes a heat sink and heat regulator. A number of simultaneous or parallel endothermic and exothermic reactions take place continuously on the coke bed surface and within the coke bed. These reactions, when balanced quantitatively, and at a constant temperature, result in a net coke production or combustion.

In general, the following processes consume heat:
The boiling of the water from dilute sulfuric acids:

| $H_2O$ liquid $\rightarrow$ $H_2O$ Steam | +44087 KJ/Mol |
|---|---|

The vaporization and separation of sulfuric acid:

| $H_2SO_4$ liquid $\rightarrow$ $H_2SO_4$ vapor | +50,103 KJ/Mol |
|---|---|
| $H_2SO_4$ vapor $\rightarrow$ $H_2O$ + $SO_3$ | +175,887 KJ/Mol |

The separation of hydrocarbons:

| $CH_3-(CH_2)_x-CH_3 \rightarrow C_x + (H_2)_x$ | +229,437 KJ/Mol |
|---|---|

The melting and varporization of elemental sulfur

| S (solid) $\rightarrow$ S (liquid) | +1260 KJ/Mol |
|---|---|
| S (liquid) $\rightarrow$ S (vapor) | +48,600 KJ/Mol |

Also heat consuming is the amount of primary air blown in to effect the necessary partial combustion in rotary furnace 5.

The following reactions furnish heat in the process:

| $2H_2 + O_2 \rightarrow 2H_2O$ (steam) | −242,000 KJ/Mol |
|---|---|
| $2C + O_2 \rightarrow 2CO$ | −124,350 KJ/Mol |
| $H_2 + S$ vapor $\rightarrow H_2S$ | −82,060 KJ/Mol |
| $CO + S$ vapor $\rightarrow COS$ | −142,650 KJ/Mol |
| $S + O_2 \rightarrow SO_2$ | −297,140 KJ/Mol |

A mixture of combustible gases, such as CO, COS, $H_2S$ and S vapor, are formed in rotary furnace 5 by partial combustion and decomposition. Furthermore, this gas contains, besides a small amount of $SO_2$, undecomposed $SO_3$ as well as steam. The gas mixture of reducing and combustible gases which leaves or exits from rotary furnace 5 contains predominantly CO, COS, $H_2S$, S vapor and some $SO_2$, undecomposed $SO_3$, as well as $H_2O$ (steam).

The gas mixture formed in rotary furnace 5 is fed, in a second stage of the process, to intermediate combustion chamber 6, together with 10 to 15% of the necessary air for the whole process. This air can be drawn in from the atmosphere if a reduced pressure is maintained in chamber 6. Thus, the air can be supplied by means of conduits 8, 12 and 13 to the entrance of chamber 6. Conduit 8 is considered the source of all secondary air used in the process. As a result of the air fed in, the temperature increases to about 1150° C. to 1350° C., and preferably to about 1200° C. to 1300° C. These temperatures are sufficient to decompose the $SO_3$ which is present in the gas. Simultaneously, however, the reducing ability of the gas stream is maintained.

The complete decomposition in intermediate combustion chamber 6 of all of the $SO_3$ in the gas stream prevents corrosion of other equipment which may be used later in the process, such as a waste heat boiler 10, and also eliminates problems during subsequent cooling and catalytic oxidation of the separation gas.

The especially difficult problem, involved in all previously known acid separation processes, of obtaining complete combustion of all hydrocarbons in waste sulfur-containing materials is solved easily according to the process of the invention. Due to the pyrolytic decomposition of higher molecular weight hydrocarbons in the rotary furnace 5, and to a large extent in intermediate combustion chamber 6, the generation of vapors of high boiling hydrocarbons which are difficult to burn is prevented. The gas which flows from the intermediate combustion chamber 6 to the secondary combustion chamber 9 contains, besides methane, only traces of $C_2$ and $C_3$ hydrocarbons.

In carrying out the process of the invention, it is desirable to maintain volume velocities of from about 200 to 400, preferably 220 to 360, $Nm^3$ gas/$m^3$ of combustion space, in the intermediate chamber 6. A good turbulent mixing of the gas with the secondary air is desirable in the intermediate chamber 6. The desired turbulent mixing can be achieved, at least in part, by arranging the entrance 14 and the exit 15 of intermediate chamber 6 so as to be at 90° from each other. This causes the gas flow to change direction as it flows through chamber 6 and this creates turbulence.

The gas from the exit of intermediate combustion chamber 6 together with about 20 to 45%, and preferably 25 to 35%, of the total air needed in the whole process, is fed with intensive turbulent mixing into secondary combustion chamber 9. The air can be supplied by conduit 16. As a result of the cooling effect of the air and because of additional combustion, the temperature in the front or forward portion I of secondary combustion chamber 9 is maintained in the range of about 1000° C. to 1200° C., and desirably 1100° C. to 1150° C. Volume velocities of 50 to 180, preferably 80 to 150, $Nm^3$ gas/$m^3$ of combustion space are maintained in portion I of secondary chamber 9. By feeding the remaining amount of air necessary for the whole process into about the center of secondary chamber 9 by means of conduit 17, the rearward combustion space II in that chamber is maintained at a temperature of about 1000° C. to 1200° C., and desirably 1100° C. to 1150° C. In addition, volume velocities of 150 to 400, preferably 200 to 350, $Nm^3$ gas/$m^3$ of combustion space are maintained in space II.

Due to the presence of combustible components in the separation gas, particularly S vapor, $H_2S$, COS and CO, a complete combustion of the remaining hydrocarbons takes place in chamber 9. The strongly exothermic oxidation of CO and $H_2S$ takes place with release of the following amount of heat:

| | |
|---|---|
| $2CO + O_2 \rightarrow CO_2$ | $-285{,}120$ KJ/Mol |
| $3H_2S + 2O_2 \rightarrow H_2O + SO_2$ | $-519{,}00$ KJ/Mol |

Most of the secondary combustion is carried out in chamber 9 by blowing air into the secondary combustion chamber 9 at two locations by conduits 16 and 17, thereby effecting a controlled long flame combustion. This elongated combustion results in complete oxidation of all reducing gas components, without the development of renewed temperature peaks which causes the undesirable formation of nitrous oxides.

The addition of secondary air by means of secondary air conduit 8 and branch conduits 13, 16 and 17 causes a considerable lowering of the temperature at the places where it is added but this is then compensated for by the combustion which takes place. The addition of the separate partial secondary air volumes is so controlled that a temperature increase is readily noticeable immediately following or behind the air injection locations.

After the remaining amount of air has been added by conduit 17, a residence time of 1.5 to 3, and preferably 1.5, seconds for the gas in space II should be maintained before the gas is withdrawn and fed to waste heat boiler 10 to be cooled. The gas is fed from waste heat boiler 10 to separation gas exit 11.

The gas total residence time in the pre-combustion chamber (rotary furnace 5) and the main combustion chambers 6 and 9 should be about 5 to 11, and preferably 6 to 8.5, seconds to guarantee perfect combustion. By maintaining the previously given temperatures and volume velocity ranges, these conditions are achieved. The amount of air added for combustion is carefully measured so that at the end of the process the exiting separation gas has an oxygen surplus of about 1 to 3%.

The sizes of the rotary furnace 5, the intermediate combustion chamber 6 and the secondary combustion chamber 9 are defined by the above-given data. These parts of the overall multi-stage combustion furnace should be designed so that the gas mixture formed in the various stages of the process is intensively mixed with the air fed into the intermediate chamber 6 and the secondary chamber 9. Displacing the entrance and exit 90° from each other in one or both of these chambers greatly contributes to the production of turbulent mixing.

The volume velocities given above for the intermediate chamber 6 make clear that, for this chamber, it is of great importance that a certain temperature be reached and that sufficiently reducing conditions be maintained. However, there is greater tolerance with respect to the volume velocity, amount of air, temperature and gas residence time in the two combustion spaces I and II of secondary combustion chamber 9, so long as the minimum conditions needed for complete combustion are maintained.

When the process is properly practice, the amount of the air supplied to each section as above described, is so adjusted that a partial combustion of the combustible gas components is effected and not exceeded. This mode of operation makes possible maximum temperature control and maintenance of a reducing atmosphere or condition in a range in which complete decomposition of any remaining $SO_3$ must take place.

The separation gases leaving the rotary furnace 5 still contain between 100 and 300 g/Nm³ of combustible components. At the most, about 50% of these combustible components are burned up in the intermediate combustion chamber 6. Burning this maximum amount of the combustible components in the gases in the intermediate chamber 6 is desirable when the waste material, such as waste sulfuric acid, has relatively low amounts of organic components or when a separating gas is to be produced having a lower concentration of $SO_2$. Normally, combustion in the intermediate chamber 6 should burn about 30 to 45% of the combustible components, and preferably it is adjusted as precisely as possible to combust 35 to 40% of such components.

Upon entering combustion space II, the gas should still contain about 10 to 22% of the combustible material present in the gas when it leaves the rotary furnace 5. The lower value is applicable when waste sulfuric acid containing little organic material is used. However, values of 13 to 18% are applicable when waste acids containing medium or high amounts of organic material are processed.

By maintaining the described conditions during operation of the process, complete decomposition of the sulfuric acid, or $SO_3$ formed from it, takes place without the formation of nitrous oxides.

The separation gas obtained in the process is free of $SO_3$, $NO_x$ and hydrocarbons and it can be used, without reservation, in any contact process of manufacturing sulfuric acid. Use of the separation gas involves no danger of corrosion in the waste heat boiler 10 or in the heat exchangers of a sulfuric acid contact group, and there is no danger that non-absorbent sulfuric acid vapors will be formed by catalytic secondary combustion of hydrocarbons or by lead chamber reactions during washing of the gas or after the end absorber. The sulfuric acid which forms is water-clear and contains fewer impurities, in particular $NO_x$ impurities, than normal contact sulfuric acid formed by combustion of elemental sulfur.

EXEMPLARY EMBODIMENTS OF THE INVENTION

The following examples explain the process of the invention in greater detail. Unless otherwise stated all percentages are by weight, as are those given hereinabove.

EXAMPLE 1

Waste sulfur-containing materials comprising 1700 kg/h of waste sulfuric acid which is 70% $H_2SO_4$, 18.5% C and 11.5% $H_2O$, and 500 kg/h of acid tar which is 45.3% C, 6.9% H, 26% (6 bound) O, 13.6% S and 7.78% ash, are added together with 890 kg/h of elemental sulfur through the port of the rotary furnace 5 onto a coke bed therein at a temperature of 500° C. Immediate evaporation of the feed with combustion of the sulfur compounds and the hydrocarbons takes place, together with partial coking of the organic compounds contained in the acids and acid tars. The primary combustion temperature in the front portion of rotary furnace 5 is maintained or controlled by blowing in 3000 Nm³/h of air. The temperature in the center and rear portions of the furnace, however, rises to 1000° C.

The gas is fed from the rotary furnace 5 to the intermediate chamber 6. The gas has about 170 g/Nm³ of combustible material. The gas discharge rate from the rotary furnace provides 700 kg/h of combustible material to the intermediate chamber 6.

About 900 Nm³/h of additional air is blown into intermediate chamber 6 as the gas travels from rotary furnace 5 to chamber 6. The temperature of the gas rises to about 1200° C. in the intermediate chamber 6. The volume velocity in the intermediate chamber is about 340 to 345 Nm$^3$/m$^3$.

After the gas leaves intermediate chamber 6, 2250 Nm$^3$/h of secondary air is blown into the gases and the mixture is delivered to combustion space I in secondary chamber 9. The temperature first drops to 1100° C. and then increases in the center of combustion space I to 1150° C. With the additional amount of air taken into consideration, a volume velocity of about 145 is obtained. The amount of combustible components in the gas drops from about 110 g/Nm$^3$ upon entering combustion space I to about 25 to 30 g/Nm$^3$ when the gas reaches combustion space II. Then 1300 Nm$^3$ of air is added to the gas. The gas temperature momentarily decreases to 1100° C. but due to added combustion it rises quickly to about 1120° C. to 1150° C. Near the end of combustion the gas has a velocity of 340 Nm$^3$/m$^3$. The separation gas is then directed from secondary chamber 9 to waste heat boiler 10 for cooling.

The composition of the separation gas produced in the process is: 10.8% SO$_2$, 10.8% H$_2$O, 7.9% CO$_2$ and N$_2$ balance. The gas is free of SO$_3$ and nitrous oxides.

About 180 kg/h of coke, which is 80% C and 20% ash, is discharged.

EXAMPLE 2

1000 Kg/h of acid tar, having the same composition as in Example 1, is fed with 425 kg of elemental sulfur through the inlet port of rotary furnace 5 onto a bed of coke at a temperature of about 500° C. There is immediate evaporation and combustion of the sulfur and hydrocarbons together with a partial coking of organic compounds present in the acid tar. To maintain the primary combustion in the rotary furnace 5 front portion, 3000 Nm$^3$/h of air is blown in. The temperature in the rear space of the furnace is 1050° C.

The separation gases leaving the rotary furnace contain about 160 g/Nm$^3$ of combustible compounds. When the separation gas is delivered from furnace 5 to intermediate combustion chamber 6 about 1000 Nm$^3$/h of air is added and, as a result, a temperature of about 1250° C. is produced in that chamber. At a volume velocity of 315 Nm$^3$/m$^3$, the combustible components are decreased by burning to a residual amount of 90 to 100 g/Nm$^3$.

The gas is then fed to combustion space I with the addition of 2300 Nm$^3$/h of air. There further combustion takes place and the combustible components are reduced to about 20 to 25 g/Nm$^3$. The temperature in the center of the combustion space I is about 1150° C.

As the gas travels from combustion space I and enters combustion space II, about 1150 Nm$^3$/h of air is added to burn the remaining combustible components. The air addition cools the gases down to 1000° C. but, as a result of the combustion which is induced by the air addition, the gases are heated up to about 1020° C. to 1040° C. before they exit from space II and are fed to waste heat boiler 10. The volume velocities in the combustion spaces I and II are, respectively, 135 and 320 Nm$^3$/m$^3$.

The composition of the resulting separation gas is as follows: 9.5% CO$_2$, 9.5% H$_2$O, 4.9% SO$_2$, 2.5% O$_2$ and the balance N$_2$. About 50 kg of coke, which is 85% C and 15% ash, is discharged per hour from the rotary furnace 5. The waste gases are free of nitrous oxides.

EXAMPLE 3

1500 kg/h of a waste sulfuric acid which is 72% H$_2$SO$_4$, 14% C and 14% H$_2$O, is fed, together with 1667 kg/h of elemental sulfur, through the inlet port of rotary furnace 5 onto a coke bed therein at a temperature of about 500° C. Primary air is also introduced into the furnace port at a rate of 3050 Nm$^3$/h. The separation gases leave the rotary furnace 5 at a temperature of 1050° C. containing 260 to 265 g/Nm$^3$ of combustible components.

The separation gases from the rotary furnace 5 are fed to intermediate combustion chamber 6 with 1150 Nm$^3$/h of added secondary air, thus raising the gas temperature to 1300° C. The separation gases leave the intermediate chamber at a volume velocity of 355 Nm$^3$/m$^3$ containing about 150 to 155 g/Nm$^3$ of combustible components.

As the gases enter combustion space I of the secondary combustion chamber 9, about 2300 Nm$^3$/h of air is added whereby the combustible components is altered to about 35 g/Nm$^3$ and the temperature increases from 1100° C. to 1150° C. when the air is added to 1200° C. in the center of space I.

To obtain complete combustion of hydrocarbons, 1150 Nm$^3$/h of air is added to the gases as they enter combustion space II from space I. The gases exist space II and are fed to waste heat boiler 10 at 1150° C. The gases are free of SO$_3$ and nitrous oxides. The volume velocities in spaces I and II are 150 Nm$^3$/m$^3$ and 340 Nm$^3$/m$^3$ respectively.

The separation gas composition is as follows: 16.5% SO$_2$, 6.0 H$_2$O, 4.1% CO$_2$, 2.5% O$_2$ and the balance N$_2$. The coke produced amounts to 30 kg/h and it is 80% C and 20% ash.

EXAMPLE 4

850 Kg/h of a waste product containing sulfonated aromatic compounds and thio compounds which is 54.03% C, 5.64% H, 30.46% (bound) O, 9.01% S and 0.78% ash, together with 1000 kg/h of waste sulfuric acid, are fed through the inlet port of the rotary furnace onto a coke bed therein at 500° C. The waste sulfuric acid is 80% H$_2$SO$_4$, 15% H$_2$O and 5% C. The primary combustion in the furnace front portion is induced by blowing in 2000 Nm$^3$/h of air. A portion of the organic compounds is decomposed by coking of its carbon content in the furnace front portion. The temperature in the furnace rear space reaches about 1000° C. and the separation gases leaving the rotary furnace contain about 100 to 120 g/Nm$^3$ of combustible components.

As the separation gases enter the intermediate combustion chamber 6 from rotary furnace 5, about 700 Nm$^3$/h of air is added. The temperature of the gases reaches about 1150° C. in chamber 6.

The separation gases which enter combustion space I from chamber 6 contain about 50 to 60 g/Nm$^3$ of combustible components. As the gases enter space I about 1450 Nm$^3$/h of air is added. The temperature in the center of space I reaches 1125° C.

As the separation gases enter space II they contain about 10 to 15 g/Nm$^3$ of combustible components and to burn them about 650 Nm$^3$/h of air is added. The final temperature reached in space II is about 1100° C. to 1130° C.

The volume velocities in the multi-stage furnace are: 245 Nm$^3$/m$^3$ in the intermediate combustion chamber 6;

100 Nm$^3$/m$^3$ in combustion space I; and 225 Nm$^3$/m$^3$ in combustion space II.

The separation gas composition is as follows: 14.8% $CO_2$, 4.1% $SO_2$, 16.4% $H_2O$, 2.3% $O_2$ and the balance $N_2$.

The coke produced amounts to 72 kg/h and it is 90% C and about 10% ash. The waste gases are free of $SO_3$ and nitrous oxides.

The foregoing detailed description has been given for clearness of understanding only and no unnecessary limitations should be understood therefrom, as modifications will be obvious to those skilled in the art.

What is claimed is:

1. A process of producing a sulfur dioxide-containing gas from a sulfur-containing waste or spent material, comprising:

feeding the sulfur-containing material, in a first stage, into a rotary furnace containing a coke bed at a temperature of at least 400° C. together with a sufficient amount of air in the range of about 25 to 55% of the total amount of air supplied in the whole or overall process to form a reducing gas so that the resulting reducing separation gas mixture formed in the furnace is heated to about 800° C. to 1100° C.;

feeding the reducing separation gas mixture, in a second stage, from the rotary furnace to an intermediate combustion chamber and adding to the reducing gas about 10 to 15% of the total amount of air required in the whole process, and maintaining a volume velocity per hour of about 200 to 400 Nm$^3$ gas/m$^3$ of combustion space as the temperature of the gas mixture increases to about 1150° C. to 1350° C.;

feeding the gas from the intermediate combustion chamber, in a third stage, to the forward combustion space of a secondary combustion chamber and adding to the gas about 20 to 45% of the total amount of air required in the whole process thereby forming a volume velocity per hour of 50 to 180 Nm$^3$ gas/m$^3$ of combustion space in the forward combustion space of the secondary combustion chamber as the separation gas cools to a temperature of about 1000° C. to 1200° C.;

in a fourth stage, feeding the remaining portion of the total air required in the whole process into the center portion of the secondary combustion chamber into admixture with the separation gas therein so that the gas admixture is at about 1000° C. to 1200° C. and a volume velocity per hour of 150 to 400 Nm$^3$ gas/m$^3$ of combustion space is thereby obtained;

removing the resulting sulfur dioxide-containing separation gas from the secondary combustion chamber; and with the total amount of air supplied in stages one to four providing the separation gas with excess oxygen up to about a 3% oxygen surplus.

2. A process according to claim 1 in which surplus coke is formed in the rotary furnace and it is removed from the rotary furnace through a discharge means.

3. A process according to claim 1 in which the sulfur dioxide-containing separation gas removed from the secondary combustion chamber is cooled by passing it through a waste heat boiler.

4. A process according to claim 1 in which the sulfur dioxide-containing separation gas is used to make sulfuric acid in a sulfuric acid contact process.

5. A process according to claim 1 in which the sulfur-containing waste or spent material is spent sulfuric acid or acid tar.

6. A process according to claim 1 in which:

in stage one, 35 to 45% of the total required air is used, the temperature of the coke bed in the furnace at the furnace entrance is about 500° C. and the temperature of the gas exiting the furnace is about 1000° C.;

in stage two, temperatures of about 1200° C. to 1300° C. and volume velocities per hour of about 220 to 360 Nm$^3$ gas/m$^3$ of combustion space are maintained;

in stage three, about 25 to 35% of the total amount of air required in the whole process is blown in and temperatures of 1100° C. to 1150° C. and volume velocities per hour of 80 to 150 Nm$^3$ gas/m$^3$ of combustion space are maintained; and in stage four, the separation gas temperature and the volume velocity per hour are maintained at about 1100° C. to 1150° C. and about 200 to 350 Nm$^3$ gas/m$^3$ respectively.

7. A process according to claim 1 or 6 in which:

the separation gas total residence time in the rotary furnace, intermediate combustion chamber and secondary combustion chamber is about 5 to 11 seconds.

8. A process according to claim 7 in which the total residence time is about 6 to 8.5 seconds.

9. A process according to claim 1 or 6 in which, after the addition of air in stage 4, the separation gas has a subsequent residence time of about 1.5 to 3 seconds in the secondary combustion space.

10. A process of producing a sulfur dioxide-containing gas from a sulfur-containing waste or spent material containing organic substances, comprising:

feeding the sulfur-containing material, in a first stage, into a rotary furnace containing a coke bed at a temperature of at least 400° C. together with a sufficient amount of air in the range of about 25 to 55% of the total amount of air supplied in the whole or overall process to form a reducing gas so that the resulting reducing separation gas mixture formed in the furnace is heated to about 800° C. to 1100° C.;

feeding the reducing separation gas mixture, in a second stage, from the rotary furnace to an intermediate combustion chamber and adding to the reducing gas about 10 to 15% of the total amount of air supplied in the whole process thereby forming a volume velocity per hour of about 200 to 400 Nm$^3$ gas/m$^3$ of combustion space as the temperature of the gas mixture increases to about 1150° C. to 1350° C.;

feeding the gas from the intermediate combustion chamber, in a third stage, to the forward combustion space of a secondary combustion chamber and adding to the gas about 20 to 45% of the total amount of air supplied in the whole process thereby forming a volume velocity per hour of 50 to 180 Nm$^3$ gas/m$^3$ of combustion space in the forward combustion space of the secondary combustion chamber as the separation gas cools to a temperature of about 1000° C. to 1200° C.;

in a fourth stage, feeding the remaining portion of the total air supplied in the whole process into the center portion of the secondary combustion chamber into admixture with the separation gas therein so that the gas admixture is at about 1000° C. to 1200° C. and a volume velocity per hour of 150 to 400 Nm³ gas/m³ of combustion space is thereby obtained;

removing the resulting sulfur dioxide-containing separation gas from the secondary combustion chamber; and with the total amount of air supplied in stages one to four providing the separation gas with excess oxygen up to about a 3% oxygen surplus.

11. A process according to claim 10 in which the sulfur-containing waste or spent material is waste sulfuric acid, acid tar, acid sludge or sulfur-containing organic compounds.

12. A process according to claim 10 in which the resulting sulfur dioxide-containing separation gas is free of $SO_3$, $NO_x$ and hydrocarbons.

* * * * *